(12) United States Patent
Gea Aguilera et al.

(10) Patent No.: US 11,668,196 B2
(45) Date of Patent: Jun. 6, 2023

(54) PROFILED STRUCTURE FOR AN AIRCRAFT OR TURBOMACHINE

(71) Applicants: SAFRAN AIRCRAFT ENGINES, Paris (FR); OFFICE NATIONAL D'ETUDES ET DE RECHERCHES AEROSPATIALES, Palaiseau (FR)

(72) Inventors: Fernando Gea Aguilera, Moissy-Cramayel (FR); Raphaël Barrier, Paris (FR); Mathieu Simon Paul Gruber, Moissy-Cramayel (FR); Cyril Polacsek, Clamart (FR); Hélène Dominique Jeanne Posson, Moissy-Cramayel (FR)

(73) Assignees: SAFRAN AIRCRAFT ENGINES, Paris (FR); OFFICE NATIONAL D'ETUDES ET DE RECHERCHES AEROSPATIALES, Palaiseau (FR)

( * ) Notice: Subject to any disclaimer, the term of this patent is extended or adjusted under 35 U.S.C. 154(b) by 0 days.

(21) Appl. No.: 17/286,751

(22) PCT Filed: Sep. 24, 2019

(86) PCT No.: PCT/FR2019/052237
§ 371 (c)(1),
(2) Date: Apr. 19, 2021

(87) PCT Pub. No.: WO2020/079335
PCT Pub. Date: Apr. 23, 2020

(65) Prior Publication Data
US 2021/0388725 A1 Dec. 16, 2021

(30) Foreign Application Priority Data
Oct. 18, 2018 (FR) ...................... 1859664

(51) Int. Cl.
*F01D 5/14* (2006.01)
*F01D 9/04* (2006.01)
(Continued)

(52) U.S. Cl.
CPC ................ *F01D 5/145* (2013.01); *B64C 3/10* (2013.01); *B64C 21/10* (2013.01); *F01D 9/041* (2013.01);
(Continued)

(58) Field of Classification Search
CPC . F01D 5/14; F01D 5/141; F01D 5/145; F01D 9/02; F01D 9/04; F01D 9/041;
(Continued)

(56) References Cited

U.S. PATENT DOCUMENTS 4,089,618 A * 5/1978 Patel ........................ F01D 5/141
416/228
2003/0152459 A1* 8/2003 Gliebe .................... F01D 5/141
415/211.2
(Continued)

FOREIGN PATENT DOCUMENTS

CN 101 716 995 A 6/2010
CN 105 332 948 A 2/2016
(Continued)

OTHER PUBLICATIONS

'Fourier Transform'. Wikipedia [online], 2018, [retrieved on Oct. 5, 2022], Retrieved from the Internet: <URL:https://web.archive.org/web/20180902000740/https://en.wikipedia.org/wiki/Fourier_transform> (Year: 2018).*
(Continued)

*Primary Examiner* — Woody A Lee, Jr.
*Assistant Examiner* — Elton K Wong
(74) *Attorney, Agent, or Firm* — Cozen O'Connor

(57) ABSTRACT

A profiled structure for an aircraft or turbomachine is elongated in a direction in which the structure has a length
(Continued)

exposed to an airflow and includes serrations defined by successive teeth and depressions. The serrations may be transverse to a leading edge and/or a trailing edge of the profiled structure and in the direction of elongation. Along the profiled leading edge and/or profiled trailing edge, the successive teeth and depressions may extend only over a part of the length exposed to the flow. The amplitude and/or spacing of the teeth may vary monotonically except for the few teeth nearest each end of the part, with a remaining part of the length being smooth.

20 Claims, 9 Drawing Sheets

(51) Int. Cl.
  *B64C 3/10* (2006.01)
  *B64C 21/10* (2006.01)
(52) U.S. Cl.
  CPC .... *B64C 2230/14* (2013.01); *F05D 2220/323* (2013.01); *F05D 2240/121* (2013.01); *F05D 2240/122* (2013.01); *F05D 2240/303* (2013.01); *F05D 2250/183* (2013.01); *F05D 2250/184* (2013.01); *F05D 2260/961* (2013.01)
(58) Field of Classification Search
  CPC .......... F01D 9/042; B64C 3/10; B64C 21/10; B64C 2230/14; F05D 2240/121; F05D 2240/122; F05D 2240/303; F05D 2260/96; F05D 2260/961; F05D 2250/183; F05D 2250/184; F05D 2220/323
  See application file for complete search history.

(56) References Cited

U.S. PATENT DOCUMENTS

| | | | |
|---|---|---|---|
| 2013/0164488 A1* | 6/2013 | Wood | F01D 9/041 29/889.22 |
| 2017/0226865 A1* | 8/2017 | Kray | F01D 9/041 |
| 2018/0023403 A1 | 1/2018 | Jones et al. | |
| 2018/0057141 A1 | 3/2018 | Shormann | |

FOREIGN PATENT DOCUMENTS

| | | | | |
|---|---|---|---|---|
| EP | 1 277 966 A2 | 1/2003 | | |
| GB | 789883 A | * | 1/1958 | ............ B64C 21/10 |
| WO | WO 2018/138439 A1 | 8/2018 | | |

OTHER PUBLICATIONS

International Patent Application No. PCT/FR2019/052237, International Search Report and Written Opinion dated Sep. 24, 2019, 11 pgs.
French Patent Application No. 1859664, Search Report dated Jun. 27, 2019; 11 pgs.

* cited by examiner

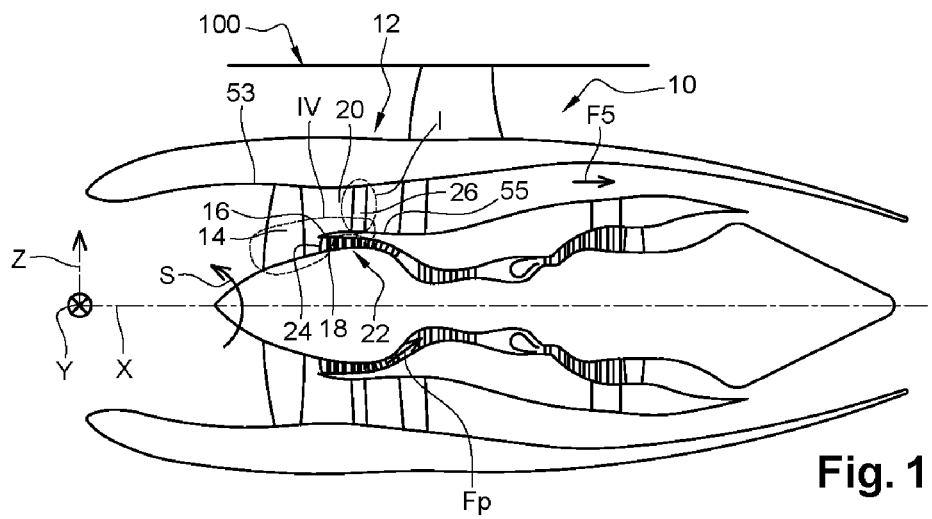
Fig. 1
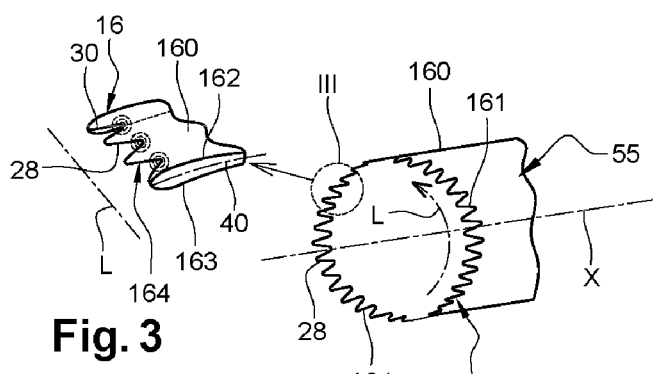
Fig. 3
Fig. 2
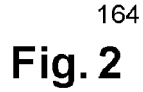
Fig. 4

PROFILED STRUCTURE FOR AN AIRCRAFT OR TURBOMACHINE

CROSS-REFERENCE TO RELATED APPLICATIONS

This application is a 35 U.S.C. § 371 filing of International Application No. PCT/FR2019/052237 filed Sep. 24, 2019, which claims the benefit of priority to French Patent Application No. 1859664 filed Oct. 18, 2018, each of which is incorporated herein by reference in its entirety.

INTRODUCTION

This invention relates to the field of the aero-acoustic management of aerodynamic profiled structures, or profiles of aerodynamic elements, such as, for example, stationary or rotating blades in an aircraft turbomachine or in a test bench for such turbomachines, or on a primary air intake beak of the turbomachine.

This type of stationary blade is found, for example, on OGV (Outlet Guide Vane) outlet guide blades, or straighteners, arranged downstream of a rotating body to straighten the airflow.

This type of rotating blade is found, for example, on a rotating impeller in a turbomachine, such as a fan or an non-faired wheel.

This concerns both faired turbomachines (turbofans/fans) and non-faired turbomachines (open-rotors). An example will be given for a double-flow turbomachine with a fan (front) and a straightener arranged in a secondary vein.

Particularly in the Ultra-High Bypass Ratio turbofan engines (UHBR; ultra-high dilution ratio fairing fan engine configuration, above 15), it is envisaged to increase the diameter of the fan and reduce the length of the suspension pod fixed to the aircraft, thus reducing the distance between the fan and the intake guide blades of IGV compressors (Inlet Guide Vanes), the OGVs and the primary air intake beak. In this type of engine, the interaction of the wake of the fan with the IGVs, the OGVs and the beak is one of the dominant sources of noise.

Beyond this observation in a turbomachine, other areas of turbomachines, but also aerodynamically profiled structures (wings, open-rotor blades—open rotor—, pylon, . . . etc.) are confronted with aero-acoustic problems of interaction with the airflow.

It has therefore already been proposed, particularly in the field of aircraft, to use aerodynamically profiled structures with a profiled leading and/or trailing edge which, following a leading and/or trailing edge line, have a serration profile including successive teeth and depressions.

Thus, this serration profile extends along the leading and/or trailing edge, i. e. in the direction of the elongation of the structure at the leading and/or trailing edge.

Especially on reduced chord profiles, but also on closed profiles—(line of) leading and/or trailing edge along a line or direction of elongation closed on itself—perimeter—, as on a turbomachine primary air intake beak, noise is mainly produced at the leading and/or trailing edge, more precisely at the depressions of the serrations where pressure fluctuations are more intense.

As regards the term "chord" used in this text, it should be noted that even though there is not strictly a "chord" as in the case of a beak (identified 16 below) separating the primary and secondary flows, the expression "in the direction of the chord (identified 40 below) of the profile" will be considered as corresponding to the direction of what is referred to below as the "general axis (X)" or "X axis", namely the axis along which the fluid flow generally flows over the profiled structure concerned, this axis being typically transverse, or even perpendicular, to the elongation of the profiled structure, which extends in said "direction of elongation".

It will be understood that the expression "transverse" does not imply a strict perpendicularity.

The invention aims to ensure a compromise between noise reduction on this structure, the aerodynamic losses to be limited, as well as the mechanical constraints, and the integration of the profiled structure into its environment.

In particular, it may be taken into consideration that in a number of situations, a said profiled structure is exposed to an inhomogeneous and/or anisotropic air flow.

It is in this context that the invention proposes several heterogeneous profiles with, in particular, the presence of serrations over a partial extent of the leading edge and/or trailing edge line.

More specifically, this concerns a profiled structure:
elongated in a direction in which the structure has a length exposed to an airflow, and
transversely to which the structure has a leading edge and/or a trailing edge, at least one of which is profiled and has, in accordance with said direction of elongation, serrations defined by successive teeth and depressions, this profiled structure being characterized in that, along the profiled leading edge and/or profiled trailing edge:
the successive teeth and depressions extend over only a part of said length exposed to the airflow, a remaining part of said length being smooth, and
over said part of the length, with the exception of zones comprising at most three successive teeth located at (closest to) each end of said part of the length, the serrations have variations in amplitude (d) and/or in spacing (L2) between two successive vertices of teeth or of depressions, said variations being monotonic.

An advantage is then to be able to follow the evolution law of the integral scale of the turbulence in the wake, also called incident flow (see FIG. 19 below). For example on an OGV, normally the integral scale is large near the casing and small near the hub (outside the boundary layer). This avoids that the above mentioned real evolution law of the integral scale is erratic.

With such variation(s) evolving according to at least one numerical function which remains either strictly increasing or strictly decreasing over the part concerned (in fact over successive at least three teeth or at least three depressions), where its direction of variation is therefore constant, it will also be possible to eliminate any aerodynamic losses or to limit the mechanical stresses, or even to facilitate the integration of the profiled structure into its environment.

In order to limit mechanical stresses and cracking at the depressions, and/or reduce manufacturing stresses, while seeking to maintain good attenuation of sound levels, it is also proposed that, over at least a part of the length exposed to the airflow where serrations are present and
either with reference to an average chord (arithmetic mean of the chord over the length L1; see FIGS. 20-25 attached),
or for each chord at each serration along said direction, these serrations respect, transversely to the direction of elongation, the relation: $0.005 \leq d/c \leq 0.5$, with: "d" the amplitude of the serrations in m and "c" the local or average chord of the profile structure, at the location of the serrations, in meter.

In order to limit the mechanical stresses and the formation of cracks at the level of the depressions, and/or to reduce the manufacturing stresses and/or to reduce the aerodynamic losses, while seeking to maintain a good attenuation of the acoustic levels, it is also proposed that, over a part at least of said length where serrations are present, the amplitude (d) and/or the spacing (L2) between two successive vertices of teeth or of depressions varies:

non-periodically, or,
in particular linearly (increasing or decreasing), quadratically, hyperbolically, exponentially and/or logarithmically.

In order to try to smooth the mechanical and acoustic transitions between zones and again reduce certain manufacturing constraints, it is proposed:

that along the profiled leading edge and/or profiled trailing edge the serrations thus have monotonic variations in amplitude and/or spacing between two successive vertices of teeth or of depressions, and/or that, along the profiled leading edge and/or profiled trailing edge, and by variation of amplitude and/or spacing between three successive wave-length vertices of teeth or of depressions, the serrations progressively join said smooth part of the length exposed to the airflow which is devoid of them, and/or that the serrations end (at a connection end to the smooth part) with a joint that is tangent to the smooth part.

With a comparable objective of ensuring a transition where a compromise between maximized acoustic effect and minimized mechanical stresses prevails, it is proposed that a series of at least two consecutive teeth and two depressions from said part of the length exposed to the airflow that is free of serrations has:

an increasing distance, along said direction of elongation, between two vertices of two consecutive teeth or depressions, and/or an increasing amplitude, this by going from the smooth part to the serrations, as will have been understood.

Still with the same objective, it is also proposed that, depending on the length exposed to the airflow, the serrations start and/or end with a tooth at the level of the recesses (except in the case of a "beak" type structure).

In order to still promote the mechanical structuring and the acoustic limitation effect, it is also proposed that, on said smooth part of the length, said structure has a longer chord than it is at the bottom of the nearest recess.

Depending on the case, it is foreseen that, according to said length exposed to the air flow, the serrations may be absent:

at least one of the two ends of said length, or
at the intermediate part between these ends and then present at both said ends, or
at several places along the length separated from each other, for example absent at one end and in a part of the intermediate zone.

The first case is to limit the possible mechanical stresses at the interfaces/junctions between a said profiled structure and a foot/attachment area of a rotating blade, for example on a propeller or in between two walls of an air vein.

With the second case, the aim is to limit the introduction of serrations to places where the turbulence is most severe and to remove them elsewhere so as not to disrupt the aerodynamic behaviour in these zones.

The same approach—and all the more so if several profiled structures, which can influence one another, are provided—by aiming in the invention at a set of profiled structures, each having all or some of the aforementioned characteristics, whose respective directions of elongation extend radially about an axis of revolution, and whose distance between two successive vertices of teeth or of depressions and/or amplitude is greater (or therefore longer) at a radially outer end of the length exposed to an air flow than at a radially inner end of this length.

Thus, for example, in the case where said profiled structures are OGVs located downstream of a fan, and with such amplitudes and/or wavelengths (distances between two successive vertices of depressions or of teeth) of greater serrations near the outer casing (at the heads of OGVs) than at the foot, near the inter-vein zone, the disadvantages associated with the fact that the vortices at the end of the blade tips of the blower are larger and quite energetic on many turbojet engines would be absorbed.

As a result, we will understand all the better since is also concerned by the invention:

a turbomachine having a general axis (this may be the above-mentioned axis of revolution) and comprising a rotor, which can rotate about said general axis, and a stator, the stator or rotor comprising profiled structures, each having all or some of the above-mentioned characteristics, and in particular a turbomachine in which the stator comprises (or the profiled structure is that of):

an annular separation wall (inter-veins), for separating the airflow downstream of the fan into a primary and a secondary flow, stationary OGV blades for guiding the secondary flow, which define said profiled structures.

stationary IGV blades for guiding the primary flow, which define said profiled structures, a turbomachine, which may or may not be faired (the general axis of which may be the aforementioned axis of revolution), comprising two rotors, which may rotate in parallel (along at least one parallel axis) with said general axis, and/or one and/or other of the rotors comprising said profiled structures, each having all or some of the aforementioned characteristics.

The invention will be better understood, if need be, and other details, characteristics and advantages of the invention will appear upon reading the following description given by way of a non restrictive example while referring to the appended drawings.

BRIEF DESCRIPTION OF THE FIGURES

FIG. 1 is a longitudinal cross-sectional view (X axis) of a typical turbomachine for an aircraft;

FIG. 2 shows the upstream zone (beak) of the partition wall between the primary and secondary flows, with a solution in accordance with the invention;

FIG. 3 can be either detail III of FIG. 2, or a local serration profile diagram on what may be a helicopter blade, a blade of the fan, a part of the rotor or of the straightener, a leading edge beak or aircraft wing flap;

FIG. 4 corresponds to the detail IV of FIG. 1;

DETAILED DESCRIPTION

Figure 5:
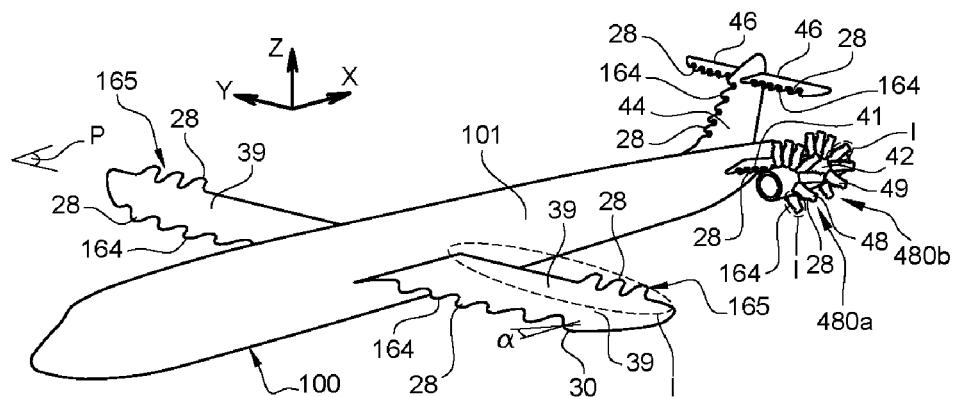
FIG. 5 schematizes an aircraft bearing structures according to the invention.

Even if this is not very clear to the eye, it must be considered that in all FIGS. 2-17 and 23-25 the variations in amplitude (d) and/or spacing (L2) between two successive vertices of teeth or of depressions are monotonic under the above conditions.

Referring to FIG. 1, an aircraft 100 turbojet 10 is schematically represented and defined as follows:

The pod 12 is used as the outer casing for the various components, including, at the front (left in FIG. 1), an upstream fan 14 (US).

Downstream (DS) of the fan 14, the airflow (locally shown in 38 in FIG. 4) is separated by the separator beak 16 of an annular wall 160 into a primary airflow and a secondary airflow. The primary airflow flows through an inner annular air passage or primary vein 18 when entering the low-pressure compressor 22 at the inlet guide vanes 24 IGV. The secondary airflow is diverted by the separator beak 16 into an external annular air passage 20 (secondary vein) towards the outlet guide vanes 26 OGV and then towards the engine outlet.

In FIGS. 2 and 3, we visualize more precisely the front part 161 of the separator beak 16, which includes the leading edge 164 located furthest upstream and at which the outer wall 162 of the separator beak 16 meets the inner wall 163 of the separator beak 16, the upper wall 162 forming the inner shell of the secondary vein 20.

In the present text, 'axial' refers to anything extending along or parallel to the longitudinal axis (X) of rotation of the concerned part of the turbomachine, the axis being in principle the main axis of rotation of the turbomachine. Radial (Z axis) is what extends radially to the X axis and circumferential is what is around it. All that is radially with respect to the X axis is inner or inner and external or outer. Thus, the inner wall 163 is the radially inner wall of the separator beak 16. Moreover, any references to upstream and downstream are to be considered in connection with the flow of gases in the (part of the) turboengine under consideration: these gases enter upstream and exit downstream, generally circulating parallel to the aforementioned longitudinal axis of rotation.

In addition, the attached drawings, and the descriptions relating to them, have been defined with reference to the conventional orthogonal reference mark X-Y-Z, with the X axis as defined above.

The separator beak 16 is defined by two faces: the outer face of the wall 162 serving as a radially inner limit to the passage of outer annular air 20 receiving the secondary flow Fs while the inner face of the wall 163 serves as a limit radially external to the internal annular air passage 18 receiving the primary flow Fp.

The lower wall 163 of the separator beak 16 forms the outer shell of the low-pressure compressor 22.

Although the axial offset (X) downstream of the IGVs 24 from the leading edge 164 of the separator beak 16 is less than that of the OGVs 26 from the same leading edge 164, the part of the front part 161 directly adjacent to the leading edge 164 of the separator beak 16 is released.

In order to reduce the noise generated by the leading edge, for example of a beak 16, OGV 26, IGV 24, it can therefore be expected that this leading edge 164 has a profile 28 having serrations including successive teeth 30 and depressions 32, as shown in the examples of FIGS. 6-17.

But structures other than on a turbomachine, such as the turbojet 10, may be affected by the solution of the invention and therefore have a leading edge 164 with a profile 28 with serrations including successive teeth 30 and depressions 32.

FIG. 5 shows an aircraft 100 on which profiled structures with such a profile 28 with serrations are present, on the leading edge, on the wings 39, on a pylon 41 supporting an engine 42 of the aircraft, on a drift 44, a stabilizer 46, one or blade 48 of an non-faired propeller rotor), or stationary blades 49 (stator) downstream of a open rotor or non-faired propeller. In this FIG. 5, there are two aircraft propulsion turbomachines, comprising two groups of open-rotors, each with two coaxially successive rotors 480*a*, 480*b*, which can rotate about at least one axis parallel to said general axis (X), one and/or the other of these rotors comprising profiled structures 1.

In addition, FIG. 3 schematizes a localized serration profile 28 on what may be identified as 50, a helicopter blade, a fan blade, a part of the rotor or downstream guide blade, a leading edge beak or an aircraft wing flap.

All these aerodynamic profiles have in common that they generate a boundary layer on the downstream surface, and therefore a turbulent flow.

Whatever the application, as regards the profile 28 with serrations, we will consider here:

that this profile belongs to a profile structure 1 (or an aerodynamic profile), around which airflows which is elongated in a direction Z in which the structure (or profile) has a length L1 exposed to the airflow, and that, transversely to the Z direction, the structure (or the profile) 1 has a leading edge 164 and/or a trailing edge 165 (the separating beak 16 does not have a trailing edge), at least one of which is profiled and therefore has, in accordance with said Z direction of elongation, serrations (profile 28) defined by said successive teeth 30 and depressions 32.

The teeth 30 and depressions 32 come after one another, alternately.

The number of teeth 30 and the number of depressions 32 will be between 3 and 100, to optimize efficiency.

In order, as mentioned above, to take into consideration that, in a number of situations, a said profiled structure 1 is exposed to an inhomogeneous and/or anisotropic airflow and to ensure a compromise between the targeted noise reduction, the losses aerodynamics to be limited, as well as the mechanical stresses, and the integration of the profiled structure in its environment, it is therefore proposed that, along the profiled leading edge 164 and/or the trailing edge 165, serrations (28) be present on a limited zone of the length L1 (see FIGS. 7 to 14).

To usefully complete the solution, and for the same purpose, it is further proposed that:
- over at least a part of the length where the serrations 28 exist,
- and more precisely with the exception of zones (such as 33 and 35 FIG. 6) comprising at most three successive teeth located at each end of said length part:
- the serrations 28 have (see FIGS. 6, 10, 16 and 20-25, in particular):
- transversely transverse to the direction of elongation Z, an amplitude d of serrations which varies monotonously, and/or
- along said direction of elongation, a distance L2 between two successive vertices (300, 320 respectively) of teeth 30 or of depressions 32 which varies monotonically.

In a, the amplitude d can be measured, along the X axis, between a vertex 300 of tooth 30 and the bottom 320 of an immediately adjacent depression 32.

With a ratio between the largest and smallest amplitude between 1.2 and 20, including if necessary taking into account the transition/connection zone 28a mentioned below, the serrations 28 will be efficient in terms of acoustic efficiency, mechanical resistance and integration (fixation) in their local environment.

To usefully complete, and for the same purposes, this constraint on d and L2, it will be possible to make heterogeneous (non-uniform over their active length L1) the serration profiles 28 of all the following solutions, with thus radial evolutions of these serrations; see FIG. 7-10.

In particular, the successive teeth 30 and depressions 32 will only extend over a part L1a of this length L1a exposed to the airflow. A remaining part L1b of the length L1 will be smooth (i. e. without serrations); part 280.

Figure 6:
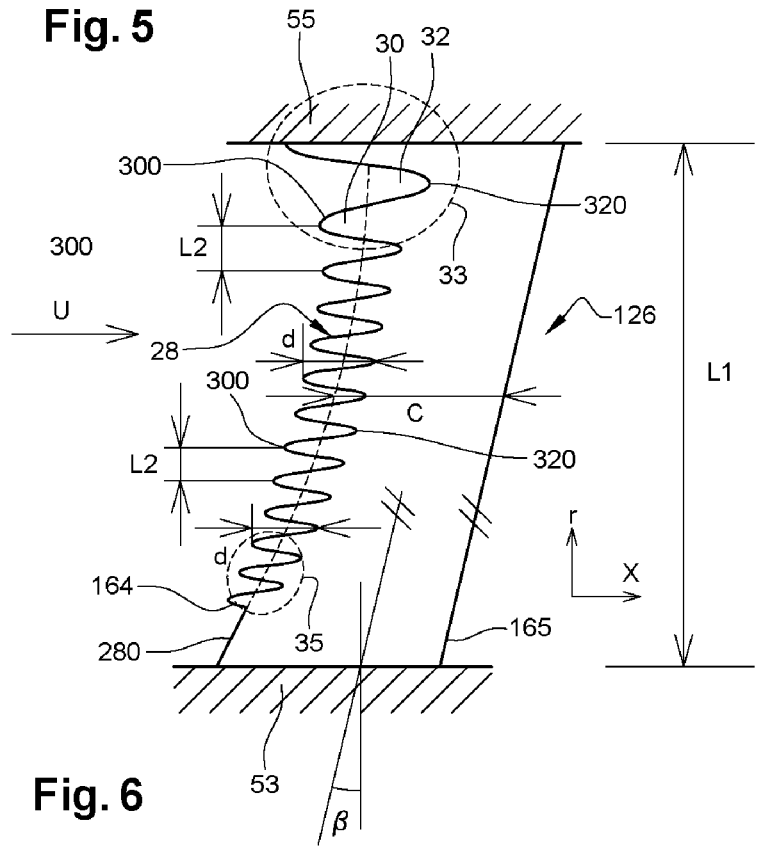
FIGS. 6 to 14 schematize various forms of serrated profiles in accordance with the invention, which may for example correspond to zone I of FIG. 1 or 5.

To further refine this compromise and in particular to prevent the formation of cracks in the depressions, for example FIG. 6, illustrates the interest that serrations 28 may have in respecting, transversely to the direction of elongation Z, the following relationship: $0.005 \leq d/c \leq 0.5$, with:
"d" the amplitude of the serrations, in meter, and
"c" the chord of the profiled structure, at the place of these serrations, in meter.

This chord c will be either the arithmetic mean of the chord over the length L1) over the length L1a, or the one at each serration, (one tooth followed by a depression), in said direction Z; see FIGS. 6,10, and 20-22.

Figure 7:
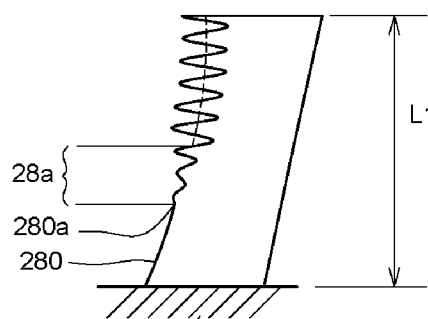
Figure 8:
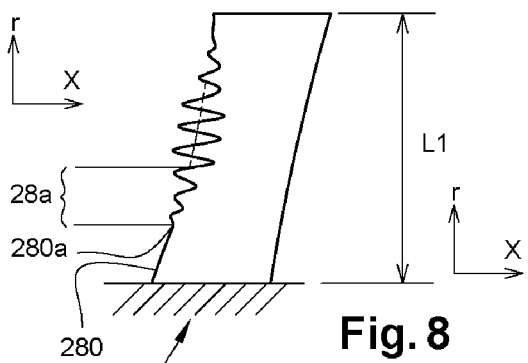
Figure 9:
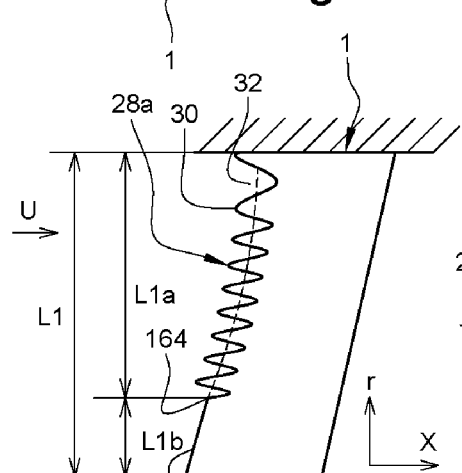

The search for the above-mentioned compromise has also revealed the interest that there may be in providing a connection, also called a transition zone, 28a:
- where, by variation—and more precisely, by going towards the smooth part 280, global, monotonic decrease—of amplitude d and/or of spacing L2 between two successive vertices, respectively 300, 320, of teeth 30 or of depressions 32, the serrations will gradually connect (transition zone/connection 28a) to said smooth part 280; cf. FIGS. 7-8, and/or
- where the serrations 28 will end (at their connection end to the smooth part) with a zone 280a which will tangent said smooth part 280; see FIGS. 7-8.

In particular in this situation, there will be at least a structural advantage in that, along the length L1, the serrations 28 begin and end with a tooth 30 at the level of the recesses on the zones with serrations, as illustrated in FIGS. 6.7. The term 'recesses" refers to the insertions of the structures into their supports, at the end(s) for example the outer casing 53 and/or the central hub 55.

To seek this compromise even further may even lead to deciding that, particularly in transition zone 28a, a series of at least two (preferably three) teeth 30 and two (preferably three) consecutive depressions 32 from said part L1b of the length without any serrations will have:
- an increasing distance L2, in said direction of elongation, between two successive vertices of teeth or of depressions, and/or
- an increasing amplitude d, as shown in particular in FIGS. 7.8.

In addition, by providing a longer chord c on the smooth part 280 than it is at the bottom (the vertices 320) of the nearest depression 32, the mechanical structure and the acoustic limiting effect will be strengthened, by promoting the definition of the transition zone 28a.

In the following, the explanations will focus on the example of the OGVs 26 in that it is typically a critical zone since it is located just downstream of the fan 14. But the characteristics concerned can be extrapolated to other cases of profiles with serrations 28.

The serrations 28 at the leading edge 164 of the OGVs 26 can disrupt the aerodynamic properties of the OGV or can make the mechanical integration of the OGV into the vein 20 difficult (FIG. 1). In order to limit the impact of these serrations on the aerodynamic performance of the OGVs, on local mechanical constraints and on their integration, it was chosen that such serrations would cover only between 0.05 L and 0.95 L of the active span (length L1) of the OGV.

FIGS. 11-14 illustrate different situations of such partial areas of serrations 28 on the leading 164 and/or trailing 165 edge.

Figure 11:
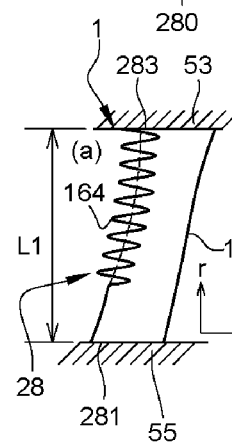
Figure 12:
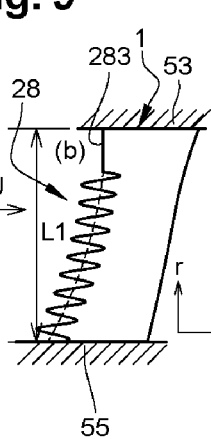
Figure 13:
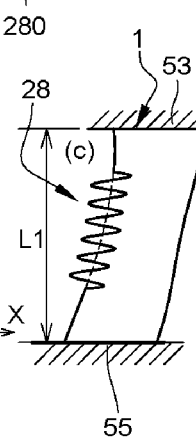
Figure 14:
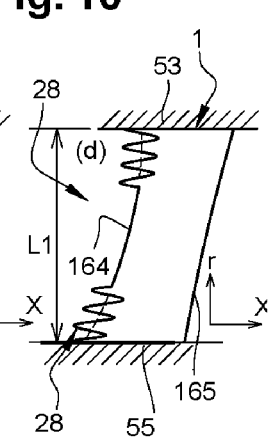

So:
- in FIG. 11: Serrations 28 absent at the inner end 281 of the profiles (here absent at the foot of the OGV). The aim is to release mechanical and/or aerodynamic stresses at the inner end, while maintaining good attenuation of sound levels at the outer end 283 (near the outer casing 53 in the example) where the intensity of turbulence and the integral scale of turbulence are significant. The serrations near the outer casing could also be useful to avoid possible separation of the boundary layer at certain speeds or flight conditions,
- in FIG. 12: Serrations 28 absent at the outer end 283 of the profiles (here absent at the head of the OGV). The aim is to release the mechanical and/or aerodynamic stresses at the head while maintaining good attenuation over the rest of the span of the profile or to avoid possible separation of the boundary layer at certain speeds at the foot of the structure (support, e. g. central hub 55 to which the annular wall 160 can belong; FIGS. 2, 4),
- in FIG. 13: Serrations 28 present in the intermediate part of the profile at the level, but absent at the outer 283 and inner 281 end. The aim is then to eliminate possible mechanical stresses at the junctions between the structure concerned and here the limits of the vein 20 (outer casing 53 and hub 55 in the example), by eliminating the foot 281 and head 283 serrations of the OGV while retaining their interest in addressing intermediate turbulent wakes,
- in FIG. 14: Serrations 28 present at the outer end 283 and inner end 281, but absent in the intermediate part of the profile. The aim is to limit the introduction of serrations to zones where the turbulence is most severe and to remove these serrations elsewhere so as not to disrupt the aerodynamic behaviour in these zones. In particular at a median operating speed, between idle and full speed, the separation of the boundary layer towards the outer 283 and inner 281 ends will be limited.

Figures 15, 16:
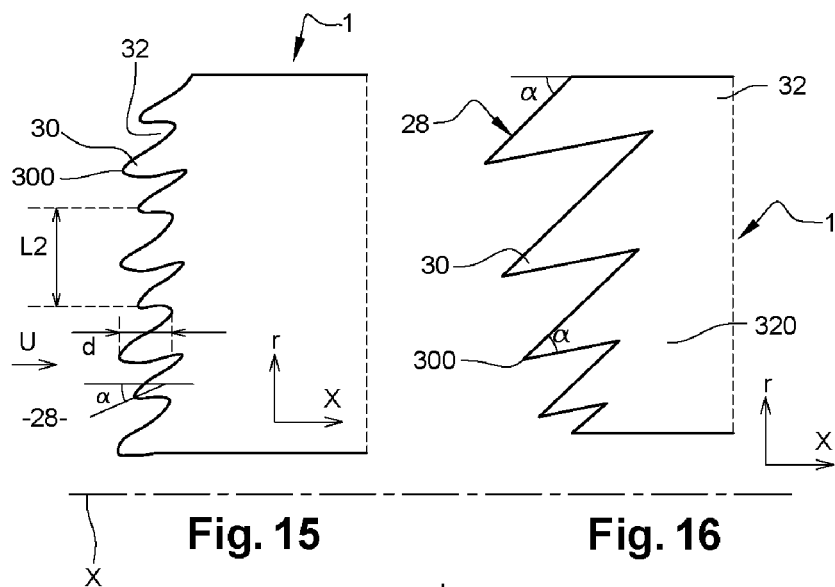
FIGS. 15-16 schematize two other profiles with serrations according to the invention, and in particular angularly offset (angle α)
Figure 17:
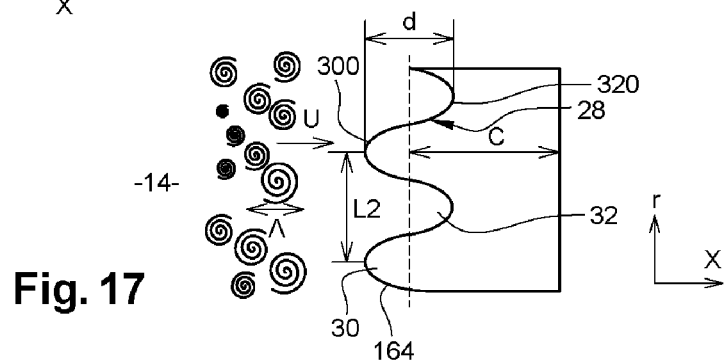
FIG. 17 is a local enlargement of an example of a serration zone, in accordance with the invention, downstream of a fan.

As regards the shape of the serrations 28, it could be rounded undulations, such as sinusoidal undulations, or other shapes, such as the fir tree shape illustrated in FIG. 16. FIGS. 15, 16, but also FIG. 5, (some) serrations 28 have an acute incident angle α with respect to the X axis.

Depending on the case, the sweep angle of structure 1 can also be adapted to the perpendicular to the X axis at the location of the structure.

Figure 10:
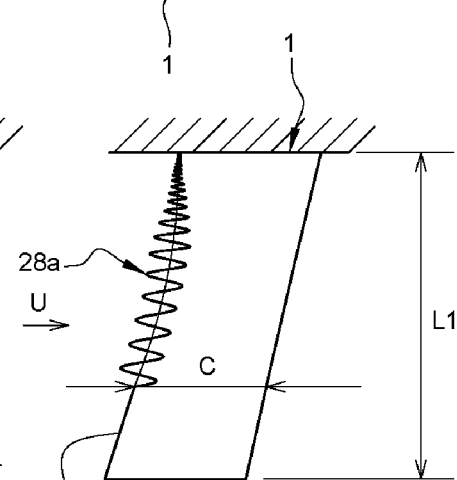

To increase the decorrelation or phase shift between the noise sources along the span, it may also be possible to choose that the profiled leading edge 164 and/or trailing edge 165 will extend along a general curved line with a concavity oriented upstream, as shown for example in FIG. 6 or 10.

It will also be understood from the above that the structure 1 on which we have reasoned can typically, as in the non-exhaustive case of an application to OGVs, belong to a set of profiled structures each having all or part of the above-mentioned characteristics, and whose respective directions of elongation Z will radially extend around the X axis.

Especially in the non restrictive case of such OGVs 1/26, it will also be possible to try to absorb the disadvantages associated with the tip vortices of the blades of the fan 14, where they are larger than elsewhere and quite energetic.

For this purpose, it may be sought that the distance L2 between two successive vertices 300, 320 of teeth or of depressions and/or the amplitude d is greater (or therefore longer) at the radially outer end 283 of the length L1 than at the radially inner end 281, thus following a law of monotonic evolution.

Thus, the amplitudes and/or wavelengths of the serrations 26 concerned will be greater near the outer casing 53 than near the inter-vein zone (hub 55/wall 160).

It should also be noted that the invention makes it possible to take into account the local properties of the turbulent flow U concerned, such as the one upstream of the OGVs for example, to define the geometry of the undulations as a function of the radial distribution of the integral scale of turbulence (A in FIG. 19) in the wake of the fan 14. It is noted that the wake in FIG. 4 can interact with both the OGVs (above the beak) and the IGVs (below the beak).

In connection with this point, FIG. 6 shows an OGV 1/26 with undulations optimized according to the integral scale A of local turbulence along the span. It should be noted that the amplitude of the undulations and the "wavelength" L2 are much greater near the casing 55 than at the foot of the OGV (support/hub 55). This is due to the vortices at the blade tips of the fan 14.

Figure 18:
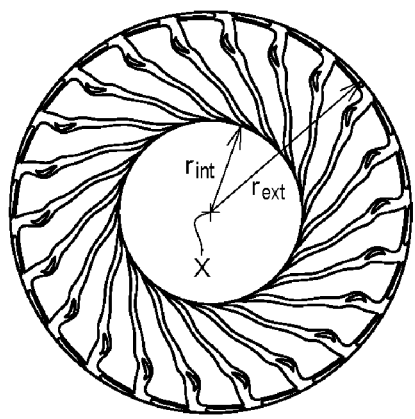
FIGS. 18-19 respectively schematize an axial section of turbulence intensity in the wake of a double-flow turbomachine, up to the OGVs, and the corresponding radial evolution of the integral scale of turbulence (^) as a function of the radius (r), between the inner radius rint and the outer radius rext of the air vein, identified 20 below, and FIGS. 20-22 schematize leading or trailing edge length portions with serrated profiles having a varying amplitude and/or frequency; solid lines show the actual serrations profiles, thinner grey wavy lines show ghost serration, profiles, calculated to define the average chord and containing a reference profile from which the stretches or contractions of the actual profile have been defined, monotonic variations in amplitude and/or spacing, and FIGS. 23-25 schematize portions of leading or trailing edge length with serrations where serration transformations follow specific and monotonous (at least partially) non laws, such as linear, logarithmic and parabolic evolution, respectively.
Figure 19:
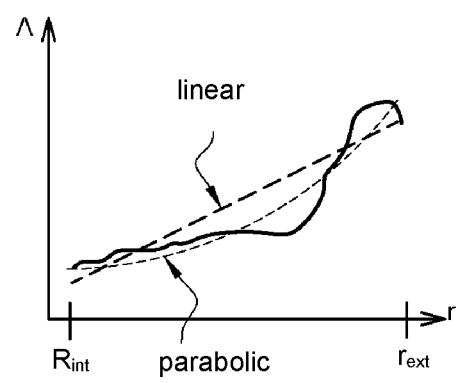

FIGS. 18 and 19 also schematize the turbulence intensity and radial evolution of the integral turbulence scale, in the wake of the blower 14, up to the OGVs 26, respectively. In this example, from the outer ⅔, the integral scale of turbulence (A) abruptly increases, to peak just before the outer radius, rext. In practice, a parabolic or quadratic evolution as shown in dotted line in FIG. 19 can be used to define the evolution of the serrations.

Figures 20, 21:
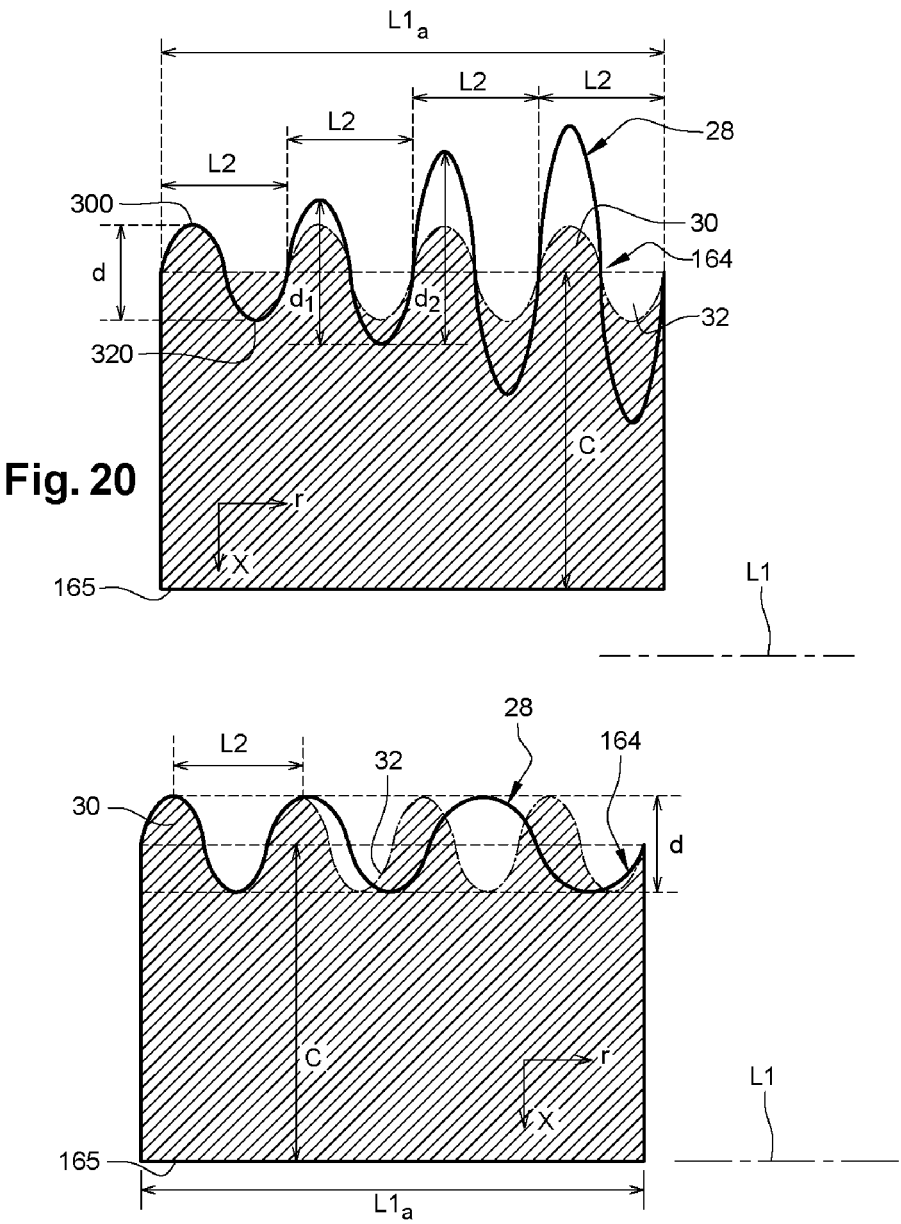
Figure 22:
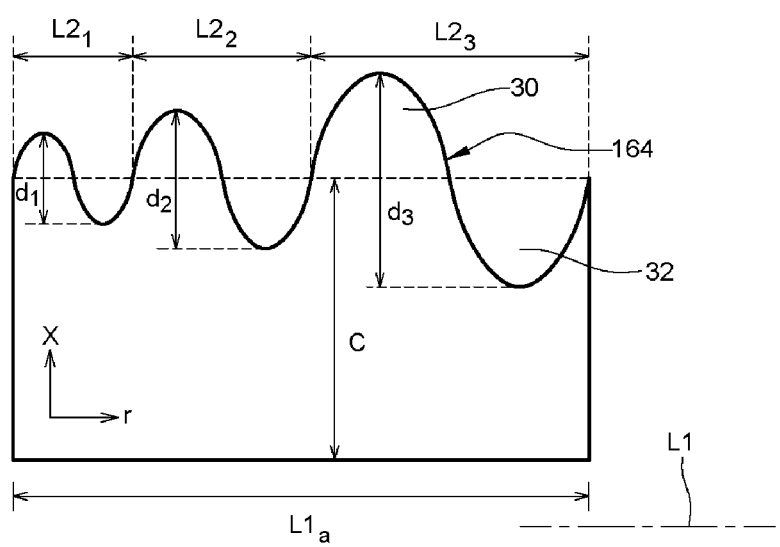

In the solutions of FIGS. 20 to 22, situations have been presented where, in order to again take into consideration an inhomogeneous and/or anisotropic airflow and to best ensure the aforementioned acoustic/aerodynamic/mechanical compromise, it is therefore proposed that, along the leading edge 164 and/or the trailing edge 165 of the profile(s), over at least part of said length L1, the serrations 28 have a repetitive geometrical pattern but the shape of which has a stretching and/or a contraction:

transversely to the direction of elongation (an amplitude that varies; see $d_1$ to $d_2$ in FIG. 20; see also FIG. 22), and/or according to the direction of elongation (a length of the repeating pattern in the direction of elongation is then variable; see lengths $L2_1$ to $L2_3$ in FIG. 22; see also FIG. 21).

Thus, along the leading edge 164 and/or the trailing edge 165, the serrations (28, 28a) will, over at least a part of said length (L1) exposed to the airflow, present a geometric pattern transformed by successive scaling, via multiplicative factors, this along the direction of elongation (L2, $L2_1$, $L2_2$, $L2_3$, ...) and/or transversely to the direction of elongation (d, $d_1$, $d_2$, ...).

In the first two cases (FIGS. 20-21), the stretching and/or contraction of a "reference" repetitive geometric pattern maintains the pattern either in amplitude or in frequency following a monotonic evolution law (length L2 of the pattern, in the direction of elongation).

Thus, in FIG. 20, if we take the grey one in the figure as the pattern reference, we can see that according to the length L1, the length or frequency L2 of the pattern is preserved and that on the other hand the amplitude d varies ($d_1$, $d_2$ ...). In the solution of FIG. 21, it is the opposite: the amplitude d is retained and the length or frequency of the pattern L21, L22, L23 . . . .

In FIGS. 20-21, a periodic serration profile, defined by a repeated geometric pattern ("reference" pattern, an example of which is shown in grey) with two characteristic directions with two characteristic directions (e.g. the X,r directions of the figures concerned, with r≠X, and for example r=Z), has been modified by means of the following transformation: the generic pattern is scaled to the desired size via a multiplicative factor in one characteristic direction, while in the other characteristic direction the dimensions of the pattern may remain unchanged (FIGS. 20-21), or may be followed by a scaling process (FIG. 22).

However, for zones with a high acoustic impact, stretching and/or contractions which will vary in amplitude and frequency, may be preferred, a s in the example in FIG. 22: frequency L2 and amplitude d of the pattern which vary together: $L2_1$, $L2_2$, $L2_3$ . . . and $d_1$, $d_2$, $d_3$ . . . .

Once a relationship between "amplitude and frequency has been established", it may then be desirable to keep the proportions of the stretched or contracted geometric pattern; see homothety in FIG. 22.

Figure 23:
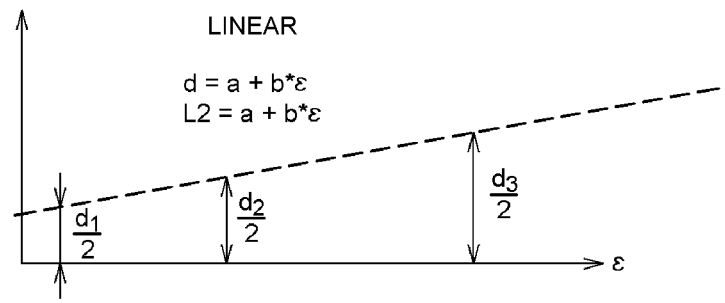
Figure 23:
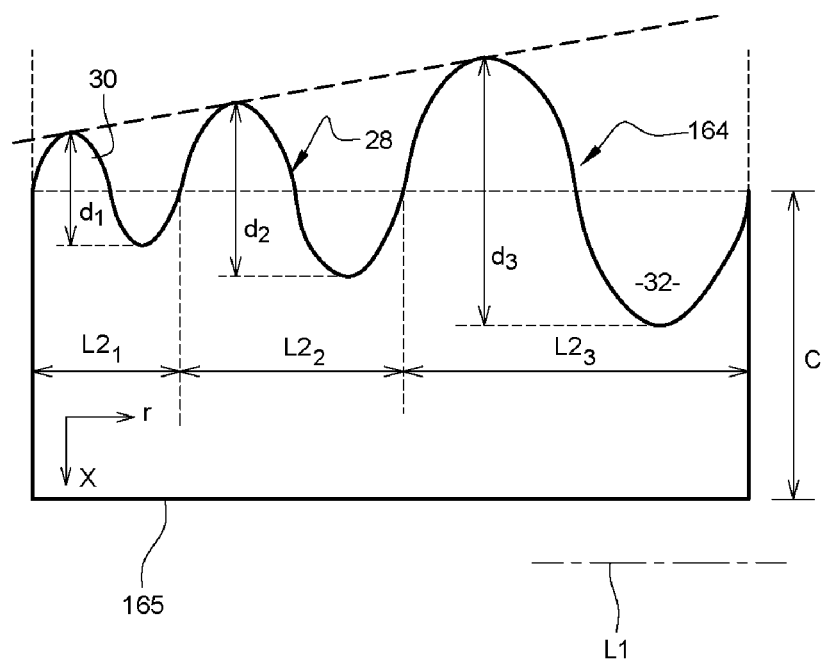
Figure 24:
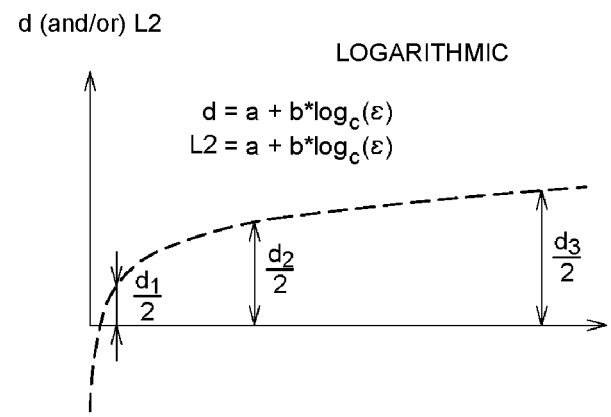
Figure 24:
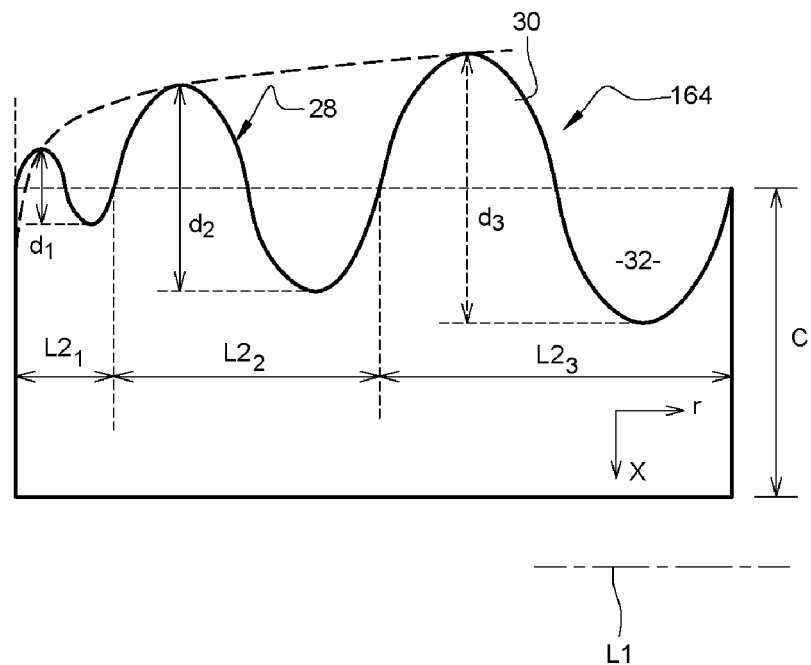
Figure 25:
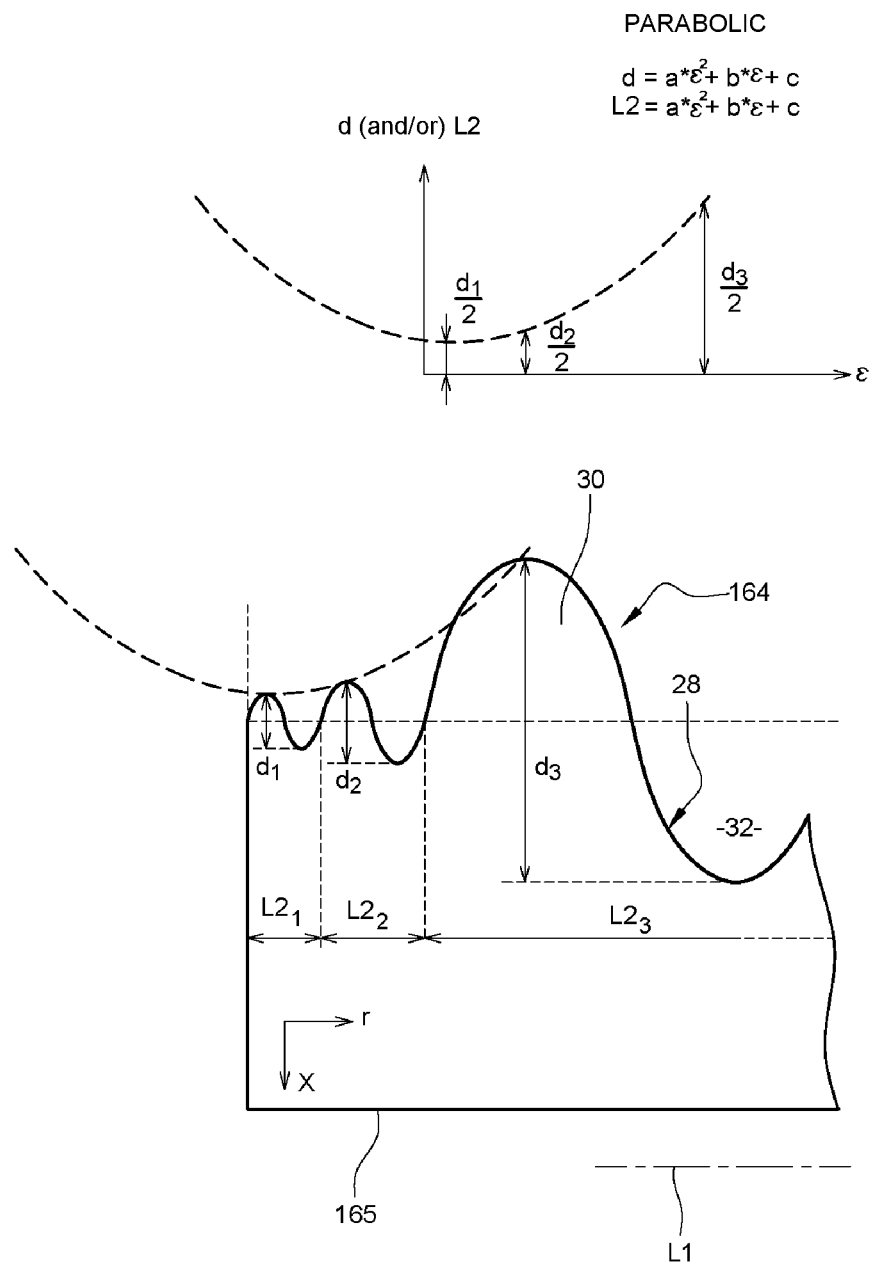

FIGS. 23 to 25 show three situations where, over at least part of the said length (L1) exposed to the air flow, the transformations of the serrations follow laws of evolution respectively:

linear (FIG. 23),
logarithmic (FIG. 24),
parabolic (FIG. 25) evolution.

A quadratic, hyperbolic or exponential law may be preferred; this in "amplitude" ($d_1$, $d_2$, $d_3$, ...) and/or "frequency" (L2, $L2_1$, $L2_2$, $L2_3$, ...), in a direction of elongation.

More generally, a non-periodic and monotonic variation in said amplitude (d) and/or frequency (L2) of the serrations 28 may be appropriate, for the same reasons as mentioned above.

The invention claimed is:
1. A profiled structure for an aircraft or for a turbomachine of an aircraft, which is elongated in a direction of elongation in which the profiled structure has a length exposed to an airflow, and which has a leading edge and/or a trailing edge, at least one of which being profiled, wherein the profiled leading edge and/or the profiled trailing edge has, along said direction of elongation, serrations defined by successive teeth and depressions extending transversely with respect to the direction of elongation, wherein, along the profiled leading edge and/or the profiled trailing edge:

the successive teeth and depressions extend over only a part of said length exposed to the airflow, a remaining part of said length being smooth, and over said part of the length, with the exception of zones comprising at most three successive teeth located at each of two ends of said part of the length, the serrations have variations in amplitude and/or in spacing between two successive vertices of teeth or of depressions, said variations being monotonic, and, wherein, over at least a part of said length where serrations are present, the amplitude and/or the spacing between two successive vertices of teeth or vertices of depressions varies linearly, or quadratically, or hyperbolically, or exponentially, or logarithmically, wherein the varying occurs over three or more amplitudes and/or three or more spacings, respectively.

2. The profiled structure according to claim 1 wherein, over at least part of the length exposed to the airflow where serrations are present and, either with reference to an average chord or for each chord at each serration along said direction, these serrations comply, transversely to the direction of elongation, with the relationship: 0.005≤d/c≤0.5, with: "d" being the amplitude of the serrations in meters and "c" being the chord of the profiled structure, at a location of said serrations, in meters.

3. The profiled structure according to claim 2 in which, along the profiled leading edge and/or profiled trailing edge and by variation in amplitude and/or spacing between two successive vertices of teeth or of depressions, the serrations progressively join said smooth part of the length.

4. The profiled structure according to claim 3, wherein the serrations terminate in a joint that is tangent to said smooth part.

5. The profiled structure according to claim 2, wherein the serrations terminate in a joint that is tangent to said smooth part.

6. The profiled structure according claim 2 wherein, on said smooth part of the length, said structure has a chord longer than the chord is at any vertex of any of said depressions.

7. The profiled structure according to claim 1 in which, along the profiled leading edge and/or profiled trailing edge and by variation in amplitude and/or spacing between two successive vertices of teeth or of depressions, the serrations progressively join said smooth part of the length.

8. The profiled structure according to claim 7, wherein the serrations terminate in a joint that is tangent to said smooth part.

9. The profiled structure according claim 7 wherein, on said smooth part of the length, said structure has a chord longer than the chord is at any vertex of any of said depressions.

10. The profiled structure according to claim 1, wherein the serrations terminate in a joint that is tangent to said smooth part.

11. The profiled structure according claim 1 wherein, on said smooth part of the length, said structure has a chord longer than the chord is at any vertex of any of said depressions.

12. The profiled structure according to claim 1 in which, over said part of the length, with the exception of said zones, a series of at least three consecutive teeth and three consecutive depressions has a strictly increasing distance, along said direction of elongation, between two consecutive vertices of teeth or of depressions.

13. The profiled structure according to claim 1 wherein, over said part of the length, with the exception of said zones, a series of at least three consecutive teeth and three depressions has a strictly increasing amplitude.

14. The profiled structure according to claim 1 wherein, along said length exposed to the air flow, the serrations are absent:

at at least one of the two ends of said length, or at an intermediate part between said ends and present towards said two ends.

15. The profiled structure according to claim 1 wherein, over at least a part of said length where serrations are present, the amplitude and/or the spacing between two successive vertices of teeth or of depressions varies non-periodically.

16. A set of profiled structures, each according to claim 1, whose respective directions of elongation extend radially about an axis of revolution, and whose distance between two successive vertices of teeth or of depressions and/or the amplitude is longer at a radially outer end of the length exposed to an airflow than at a radially inner end of that length.

17. A turbomachine having a general axis and comprising a rotor, rotatable about said general axis, and a stator, the stator and/or rotor comprising profiled structures, each according to claim 1.

18. The turbomachine of claim 17, wherein the profiled structure is located:

on an annular separating wall for separating an air flow downstream of a fan of the turbomachine between a primary flow and a secondary flow, or on an outlet guide vane (OGV), or on an inlet guide vane (IGV).

19. A profiled structure for an aircraft or for a turbomachine of an aircraft, which is elongated in a direction of elongation in which the profiled structure has a length exposed to an airflow, and which has a leading edge and/or a trailing edge, at least one of which being profiled, wherein the profiled leading edge and/or the profiled trailing edge has, along said direction of elongation, serrations defined by successive teeth and depressions extending transversely with respect to the direction of elongation, wherein, along the profiled leading edge and/or the profiled trailing edge:

the successive teeth and depressions extend over only a part of said length exposed to the airflow, a remaining part of said length being smooth, and over said part of the length, with the exception of zones comprising at most three successive teeth located at each end of said part of the length, the serrations have variations in amplitude and/or in spacing between two successive vertices of teeth or of depressions, said variations being monotonic, wherein, over at least said part of the length, the amplitude and/or the spacing between two successive vertices of teeth or vertices of depressions varies linearly, or quadratically, or hyperbolically, or exponentially, or logarithmically, wherein the varying occurs over three or more amplitudes and/or three or more spacings, respectively, and, wherein, along said length exposed to the air flow, the serrations are absent:
- at several places along said length separated from each other, or
- at an intermediate part between said ends and present towards said two ends.

20. A profiled structure for an aircraft or for a turbomachine of an aircraft,
- which is elongated in a direction of elongation in which the profiled structure has a length exposed to an airflow, and
- which has a leading edge and/or a trailing edge, at least one of which being profiled,
- wherein the profiled leading edge and/or the profiled trailing edge has, along said direction of elongation, serrations defined by successive teeth and depressions extending transversely with respect to the direction of elongation,
- wherein, along the profiled leading edge and/or the profiled trailing edge:
  - the successive teeth and depressions extend over only a part of said length exposed to the airflow, a remaining part of said length being smooth,
- wherein, over said part of the length, with the exception of zones comprising at most three successive teeth located at each end of said part of the length, the serrations have variations in amplitude and/or in spacing between two successive vertices of teeth or of depressions, said variations being monotonic,
- wherein, over at least said part of the length, the amplitude and/or the spacing between two successive vertices of teeth or vertices of depressions varies linearly, or quadratically, or hyperbolically, or exponentially, or logarithmically, wherein the varying occurs over three or more amplitudes and/or three or more spacings, respectively, and,
- wherein said variations evolve according to at least one numerical function which remains either strictly increasing or strictly decreasing, along said direction of elongation, over a succession of at least three teeth or at least three depressions.

\* \* \* \* \*